United States Patent
Goto et al.

[11] Patent Number: 6,129,378
[45] Date of Patent: Oct. 10, 2000

[54] ONE-PIECE MOLDED ARTICLES

[75] Inventors: Atsushi Goto, Gifu-ken; Tsugunori Sugiura; Yoshiaki Shichida, both of Aichi-ken, all of Japan

[73] Assignee: Toyoda Gosei Co., Ltd., Aichi, Japan

[21] Appl. No.: 09/131,184

[22] Filed: Aug. 7, 1998

[30] Foreign Application Priority Data

Aug. 7, 1997 [JP] Japan ................................. 9-227481

[51] Int. Cl.$^7$ ................................................. B60R 21/16
[52] U.S. Cl. ........................................ 280/732; 280/228.3
[58] Field of Search ................................. 280/732, 728.3

[56] References Cited

U.S. PATENT DOCUMENTS

| | | | |
|---|---|---|---|
| 5,458,361 | 10/1995 | Gajewski | 280/732 |
| 5,460,402 | 10/1995 | Rhodes, Jr. | 280/732 |
| 5,786,049 | 7/1998 | Nusshor . | |

FOREIGN PATENT DOCUMENTS

| | | |
|---|---|---|
| 42 43 652 A1 | 7/1993 | Germany . |
| 44 26 342 A1 | 2/1996 | Germany . |
| 295 21 429 U1 | 5/1997 | Germany . |
| 196 51 532 A1 | 6/1997 | Germany . |

OTHER PUBLICATIONS

Viewing et al., Kunststoff–Handbuch, Band 1, Grundlagen, Carl Hanser Verlag Munchen Wien, 1975, pp. 907 and 920.

Primary Examiner—Kenneth R. Rice
Attorney, Agent, or Firm—Pillsbury Madison & Sutro LLP

[57] ABSTRACT

A heat-resistant molded instrument panel article having a decorative appearance, produced at a relatively low cost, wherein the instrument panel article comprises a main body molded from a first synthetic resin, a section piece molded from a second synthetic resin such that the periphery of the section piece is partially or entirely surrounded by the main body, with the upper outer surface of the section piece abutting the upper outer surface of the main body, so that such surfaces form a single, level surface. A surface layer continuously covers the surface of the section piece and at least part of the surface of the main body. The main body is made of a first synthetic resin having an elastic modulus in flexure in a range of about 2,000 MPa to about 4,000 MPa and a coefficient of linear thermal expansion of about $3$–$12 \times 10^{-5}$ °C.$^{-1}$. The section piece is made of a second synthetic resin having an elastic modulus in flexure in a range of about 100 MPa to 700 MPa and a coefficient of linear thermal expansion of about $1$–$10 \times 10^{-5}$ °C.$^{-1}$. The surface layer is made of a third synthetic resin having an elastic modulus in flexure ranging from about 300 MPa to about 2,000 MPa and a coefficient of linear thermal expansion of about $3$–$12 \times 10^{-5}$ °C.$^{-1}$.

11 Claims, 6 Drawing Sheets

Fig. 9 *PRIOR ART*

Fig. 10     PRIOR ART
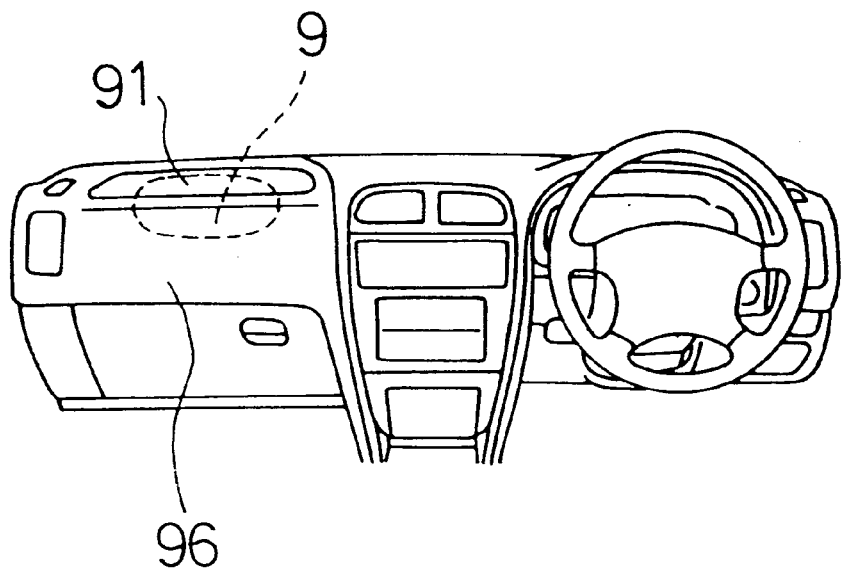

ONE-PIECE MOLDED ARTICLES

BACKGROUND OF THE INVENTION

1. Field of the Invention

The present invention relates to plastic or resin articles, particularly to molded resin parts used for housing an airbag device within a vehicle instrument panel.

2. Description of the Related Art

Airbag safety devices are common equipment in most new automobiles. As shown in FIGS. 9 and 10, an airbag device (9) comprises an airbag (92) that inflates in a collision to protect automobile occupants from injury, an airbag cover (91) overlying the airbag (92), and an inflator (93) that instantaneously blows gas into the airbag (92) causing deployment. The airbag cover (91) is connected to, for example, an instrument panel (96) provided in front of the forward passenger seat of an automobile.

The airbag cover (91) is formed of relatively soft material to permit bursting of the airbag cover (91) at a predetermined rupturing point (99) by inflation of the airbag (92) in a collision.

However, because conventional airbag covers (91) have been separate members from the instrument panel (96), the periphery of the airbag cover (91) adjacent the instrument panel (96) enclosing the airbag cover (91) may not produce level, even surfaces relative to one another. Such uneven surfaces create an unsatisfactory appearance on the instrument panel.

Moreover, such conventional airbag covers (91) require manufacture of the airbag cover (91) and the instrument panel (96) separately, after which the airbag cover (91) is incorporated into the instrument panel (96). The separate manufacture and installation steps increase the cost of production of airbag safety devices.

Furthermore, the installation of the airbag cover (91) into the instrument panel reduces the number and types of design options available for configuring the instrument panel (96).

In view of the foregoing, an airbag cover and instrument panel molded as a single piece unit would seemingly solve the problems associated with a separate airbag inserted into an instrument panel. Unfortunately, the airbag cover may be damaged during molding of a single piece unit, as the airbag cover is made of relatively soft materials when compared to the instrument panel, and thus is prone to heat deformation.

SUMMARY OF THE INVENTION

Therefore, an object of the present invention is to solve the aforementioned problems of conventional airbag devices by providing a molded plastic or resin article, such as an instrument panel, that is heat-resistant, has a decorative appearance, and is economical to produce, for example, as a single piece instrument panel housing an airbag. This invention relates to a resin instrument panel comprising a main body formed of a first synthetic resin, at least one section piece formed of a second synthetic resin different from the resin of the main body, and a surface layer that simultaneously coats the surface of the section piece and at least part of the surface of the main body. According to the invention, the periphery of the section piece is surrounded partially (FIG. 5) or entirely (FIG. 2) by the main body, and is positioned such that its surface abuts the surface of the main body, thereby forming a single, level uniform surface.

An instrument panel is defined herein to be a mantel part located, for example, at the forward section of an automobile passenger compartment, on which other interior parts, such items as gauges, dials, switches, air vents and the like are mounted. The instrument panel member must possess rigidity, mechanical strength, heat resistance and heat distortion resistance. Plastic or resin articles made according to the invention possess these characteristics, and form suitable instrument panels.

Preferably, the section piece is an airbag cover. The airbag cover preferably bursts precisely at a predetermined rupturing point to release the airbag, such as along a tear seam designed to burst upon inflation of the airbag in a collision. Since the section piece is structured to burst, the section piece functions effectively as an airbag cover.

The instrument panel of the invention comprises a main body comprising a first synthetic resin having an elastic modulus in flexure in a range of about 2,000 to about 4,000 MPa and a coefficient of linear thermal expansion is about $3–12 \times 10^{-5}$ ° $C.^{-1}$.

The section piece comprises a second synthetic resin having an elastic modulus in flexure in a range of about 100 to about 700 MPa and a coefficient of linear thermal expansion of about $1–10 \times 10^{-5}$ ° $C.^{-1}$.

The outer surface layer comprises a third synthetic resin having an elastic modulus in flexure in a range from about 300 to about 2,000 MPa and a coefficient of linear thermal expansion of about $3–12 \times 10^{-5}$ ° $C.^{-1}$.

A key feature of the present invention is that the values of the elastic modulus in flexure and the coefficient of linear thermal expansion of the main body, the section piece and the surface layer collectively lie within the above-specified ranges.

Thus, the main body is formed of a first synthetic resin having an elastic modulus in flexure in a range of about 2,000 to about 4,000 MPa and coefficient of linear thermal expansion of about $3–12 \times 10^{-5}$ ° $C.^{-1}$. A main body having an elastic modulus in flexure of less than 2,000 MPa is likely to be damaged during handling, as the rigidity of the molded product is reduced under these conditions. Conversely, an elastic modulus in flexure of more than about 4,000 MPa results in a molded resin main body which is brittle and therefore prone to crack formation.

Further, at a coefficient of linear thermal expansion of less than about $3 \times 10^{-5}$ ° $C.^{-1}$, the rigidity of the main body is reduced, thereby increasing the susceptibility of the molded main body to damage. A coefficient of linear thermal expansion of more than about $12 \times 10^{-5}$ ° $C.^{-1}$ causes misalignment between the main body and parts abutting thereon, for example door panels, and the main body attached to a fixed member such as an automobile body, may become deformed as a result.

The section piece is formed of a second synthetic resin different from the first resin, having an elastic modulus in flexure in a range of about 100 to about 700 MPa, and coefficient of linear thermal expansion of about $1–10 \times 10^{-5}$ ° $C.^{-1}$. An elastic modulus in flexure of the section piece of less than about 100 MPa impairs the control of stress forces associated with an inflating airbag, particularly at elevated temperatures. However, an elastic modulus in flexure of more than about 700 MPa causes reduced impact strength at low temperatures and increased temperature-dependent brittleness, which prevents the section piece from properly bursting during air bag inflation.

At a coefficient of linear thermal expansion of less than about $1 \times 10^{-5}$ ° $C.^{-1}$, the section piece may become brittle and prone to crack formation. When the coefficient of linear thermal expansion is more than about $10 \times 10^{-5}$ ° $C.^{-1}$, the alignment between the section piece and parts abutting thereon, such as door panels, deteriorates and causes the section piece attached to a fixed member, such as an automotive body, to be deformed.

The surface layer is formed of a synthetic resin whose elastic modulus in flexure is in a range of about 300 to 2,000 MPa and coefficient of linear thermal expansion of about $3-12\times10^{-5}$ °C.$^{-1}$. When the elastic modulus in flexure is less than 300 MPa, the surface layer may be heavily damaged by the main body and the section piece, resulting in an undesirable appearance of the instrument panel. Furthermore, surface layers previously shaped to a predetermined configuration and set within a molding cavity, prior to the injection molding of the main body and the section piece, may not properly fit within the molding cavity due to loss of rigidity of the surface layers. Similarly, when the elastic modulus in flexure of the surface layer is more than 2,000 MPa, a surface layer pre-formed into a desired configuration may not properly fit into the molding cavity during injection molding performed in the same manner as described above.

A coefficient of linear thermal expansion of the surface layer of less than $3\times10^{-5}$ °C.$^{-1}$ promotes brittleness, rendering the resin instrument panel prone to crack formation. When the coefficient of linear thermal expansion of the surface layer is more than $12\times10^{-5}$ °C.$^{-1}$, the alignment of the instrument panel with parts abutting thereon, such as door panels, tends to deteriorate and the surface layer attached to a fixed member, such as an automotive body, may become deformed.

The main body of the invention exhibits high rigidity and excellent mechanical strength with the aforementioned ranges of elastic modulus in flexure and coefficient of linear thermal expansion. The section piece of the invention, having the aforementioned ranges of elastic modulus in flexure and coefficient of linear thermal expansion, is softer than the main body member, permitting easy and precise bursting at a predetermined rupturing point, generally a V-shaped tear seam of the section piece.

Further, since the main body member, the section piece member and the surface layer member possess the aforementioned elastic modulus in flexure and coefficient of linear thermal expansions described herein, the three members may be molded as a single unit with essentially no heat deformation. Accordingly, the resulting instrument panel has a smooth level surface, lacking irregularities between the surfaces of the main body and the section piece, producing a desirable, stylish appearance.

Further, one-piece molding of the instrument panel increases the number of design options available during manufacture of the resin panel, and deletion of the step of inserting a separate airbag into the instrument panel reduces production costs.

Therefore, the invention provides for a heat-resistant resin instrument panel housing an airbag device, wherein the instrument panel housing the airbag device is a single molded unit having a desirable appearance, produced at relatively economical cost.

BRIEF DESCRIPTION OF THE DRAWINGS

FIG. 9 is a sectional view of an airbag device according to the conventional art.

FIG. 10 is a front view of an instrument panel containing the airbag according to the conventional art.

DETAILED DESCRIPTION OF THE INVENTION

Figure 1:
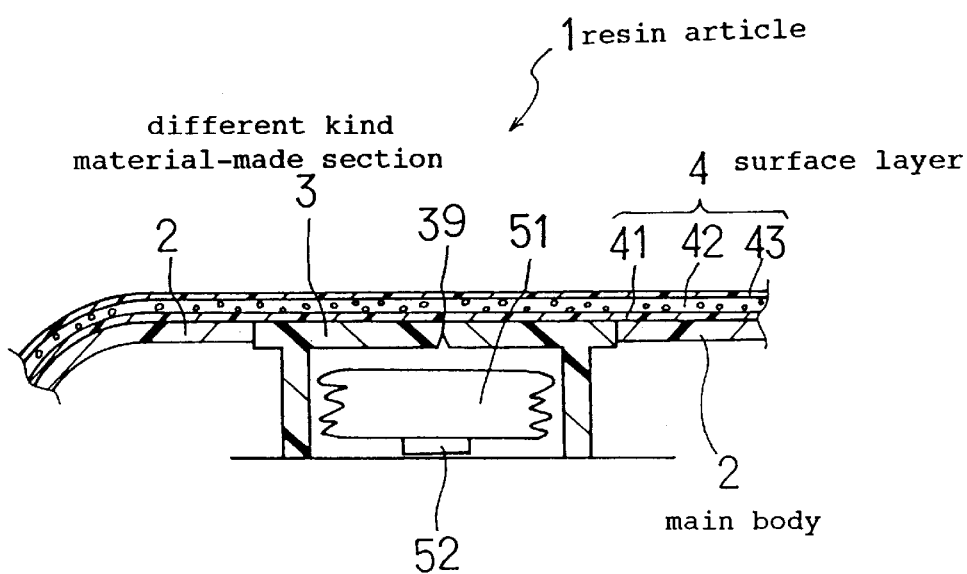
FIG. 1 is a sectional view of a resin instrument panel according to Example 1.

The first synthetic resin used for the main body of the resin article housing the airbag device can be any one or combination of resins having an elastic modulus in flexure of the range of about 2,000 to about 4,000 MPa and coefficient of linear thermal expansion in the range of about $3-12\times10^{-5}$ °C.$^{-1}$. First synthetic resins suitable for forming the main body may include thermoplastic olefin resins, thermoplastic styrene resins, thermoplastic polyurethane resins and/or thermosetting polyurethane resins. Suitable resins may be used alone or in combination.

The second synthetic resin used for the section piece can be any synthetic resin having an elastic modulus in flexure of about 100 to about 700 MPa and coefficient of linear thermal expansion of $1-10\times10^{-5}$ °C.$^{-1}$. Suitable examples of a second synthetic resin for the section piece include thermoplastic olefin resins, thermoplastic styrene resins, thermoplastic polyurethane resins, thermosetting polyurethane resins and/or thermoplastic polyester resins. The section piece may be molded from one or more of these suitable resins.

The third synthetic resin used for manufacturing the surface layer may be any synthetic resin having an elastic modulus in flexure of about 300 to 2,000 MPa and coefficient of linear thermal expansion of about $3-12\times10^{-5}$ °C.$^{-1}$. Examples of the third synthetic resins suitable for use as the surface layer include thermoplastic olefin resins, thermoplastic styrene resins, polyvinyl chloride resins, thermoplastic urethane resins, thermosetting urethane resins and thermoplastic polyamide resins. Combinations of one or more of these suitable resins may be used to form the surface layer.

The surface layer can be composed of one or more layers. For example, the surface layer is preferably a laminated material formed of a backing member and an exterior skin. This structure imparts an improved appearance to the surface layer when compared with non-laminated structures.

Preferably, the skin layer comprises materials having a desirable surface appearance such as thermoplastic polyolefin resins, polyvinyl chloride resins or the like. The skin may comprise fabric, woven cloth, or non-woven textile, or, if appropriate, flocking or a coating may be applied to the surface of the skin. During flocking, a base material is coated with a bonding agent, and the pile fibers are suitably deposited on the binder and base material, or the pile fibers are drawn up on the base material.

Preferably, the backing member adheres simultaneously to the main body and the section piece. One-piece molding of the surface layer with the main body and section piece can be achieved due to the adhesion of the backing member. The backing member may comprise any resin that sticks to or adheres to the main body and the section piece, but is preferably a thermoplastic polyolefin resin.

More preferably, an elastic foamed layer is disposed between the backing member and the skin of the surface layer. This structure permits one-piece molding of the main body and the section piece under high pressure, thereby yielding a molded article having a smooth, flat surface. Preferably, the foaming materials comprise thermosetting polyurethane resins, thermoplastic polyolefin resins, crosslinked polyolefin resins, polystyrene resins or the like. The main body and the section piece together preferably have a combined thickness in a range of 1 to 10 mm. When the thickness is less than 1 mm, the mechanical strength of the main body may be degraded. A thickness of more than 10 mm may promote shrink marks on the main body and the section piece, resulting an undesirable appearance and degradation of the bursting property of the section piece upon impact.

Preferably, the surface layer has a thickness in a range of 0.3 to 8 mm. When the thickness is less than 0.3 mm, the surface layer may be badly damaged during molding of the main body and the section piece, marring the appearance of the finished resin instrument panel. A surface layer thickness of more than 8 mm may prevent a pre-formed surface layer from properly fitting into the molding cavity during single piece molding of the main body and the section piece.

The resin instrument panel of the invention may be molded as a one-piece structure by insertion molding or injection molding. In addition, the resin instrument panel of the invention may be produced such that a molding is covered with a sheet.

This application claims priority of application number JPA 227481/1997, filed in Japan on Aug. 7, 1997, the complete disclosure of which is incorporated herein by reference.

The following examples are meant to be illustrative of the present invention; however the practice of the invention is not limited or restricted in any way by these examples.

EXAMPLES

Example 1

A plastic or resin article according to Example 1 in the present invention is described hereinafter with reference to FIGS. 1 to 4.

The resin article according to this example is an instrument panel for an automobile, having an airbag installed therein. As shown in FIG. 1, the instrument panel (1) comprises a main body (2) molded of a first synthetic resin and a section piece (3) molded of second synthetic resin, the periphery of which is at least partially enclosed by the main body (2). The surfaces of the main body (2) and section piece (3) abut each other to form one surface on the same level.

Figure 2:
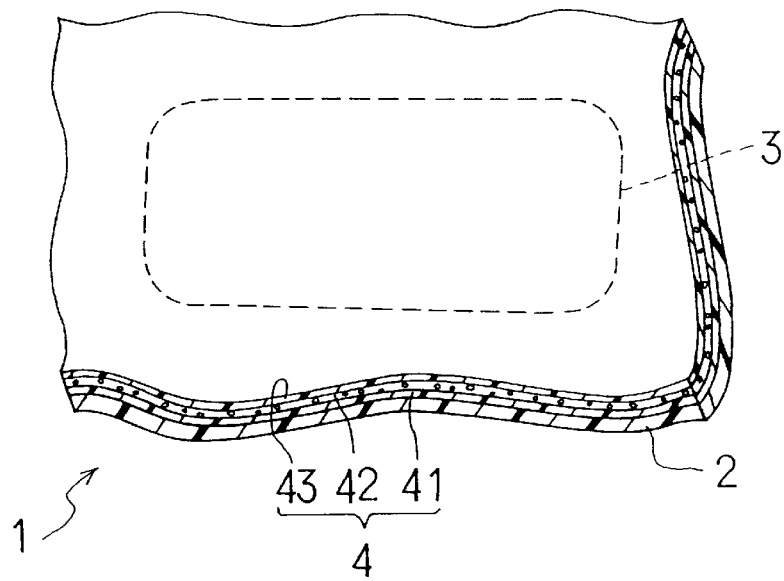
FIG. 2 is a perspective view of the resin instrument panel according to Example 1.

As illustrated in FIGS. 1 and 2, a surface layer (4) is provided on the surfaces of the section piece (3) and main body (2). The surface layer coats said surfaces continuously, covering thereof from the section piece toward the main body. The surface of the main body (2) is almost entirely coated by the surface layer (4).

The section piece 3 is an airbag cover that contains an airbag (51) as illustrated in FIG. 1. The surface layer (4) is a three-layer laminated material comprising a backing member (41), a skin (43) and an elastic foamed layer (42) disposed therebetween.

The main body (2) is molded of a synthetic resin having an elastic modulus in flexure in a range of about 2,500 to about 2,600 MPa and a coefficient of linear thermal expansion of about $6 \times 10^{-5}$ °C.$^{-1}$. The section piece (3) is molded of a synthetic resin having an elastic modulus in flexure in a range of about 200 to about 320 MPa and a coefficient of linear thermal expansion of about $4-8 \times 10^{-5}$ °C.$^{-1}$. The surface layer (4) is made of a synthetic resin having an elastic modulus in flexure in a range of about 720 to about 1,250 MPa and a coefficient of linear thermal expansion of about $4-10 \times 10^{-5}$ °C.$^{-1}$. The coefficient of linear thermal expansion described above was measured according to JIS K7197.

The main body (2) and the section piece (3), are produced by adding ethylene-olefin rubber or styrene-ethylene-butylene-styrene copolymer to a thermoplastic polyolefin resin, such as polypropylene (hereinafter referred to as PP), and a talc filler is mixed therein.

The surface layer (4) comprises a three-layer laminated structure, such that the backing member (41) comprises thermoplastic polyolefin resin such as PP, the foamed layer (42) comprises crosslinked polyolefin resin, and the skin (43) comprises thermoplastic polyolefin resin, such as PP or polyvinyl chloride (hereinafter referred to as PVC).

The filler may comprise glass fiber, mica, calcium carbonate, wollostonite, clay, barium sulfate, potassium titanate whisker, magnesium nitrate whisker, calcium carbonate whisker, or silica in lieu of talc.

The thicknesses of the main body (2), the section piece (3) and the surface layer (4) are about 3.5 mm, 4.5 mm and 4.7 mm, respectively. In the surface layer (4), the thicknesses of the backing member (41), the foamed layer (42) and the skin (43) are about 1.0 mm, 3.0 mm and 0.7 mm, respectively. The section piece (3) has centrally located concave part (39) as a predetermined rupturing point.

An inflator (52) provided on the back of the airbag instantaneously blows gas into the airbag (51) in a collision. The section piece (3) has a concave part (39) in the center thereof and the section piece bursts thereat upon impact.

A method for producing the resin instrument panel article is described hereinafter.

Figure 3:
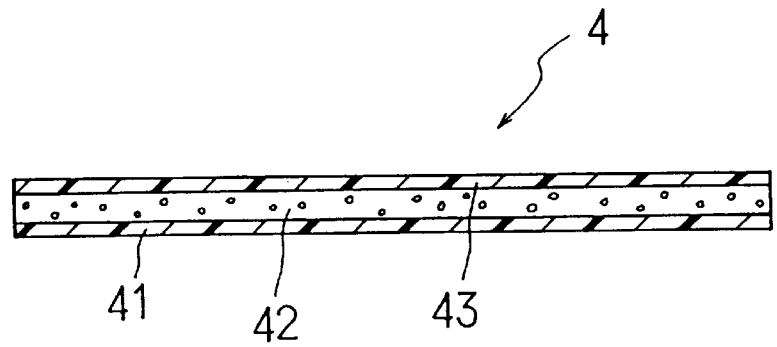
FIG. 3 is a sectional view of the surface layer according to Example 1.

Initially, the skin (43) is molded by calendar molding onto the foamed layer (42) and adhered thereto by thermocompression bonding or an adhesive agent as illustrated in FIG. 3. Thereafter, the backing member and the skin are molded by calendar molding onto the side of the foamed layer in the above-obtained sheet, and adhered to each other by thermo-compression bonding or an adhesive agent. In this manner, the surface layer (4) comprising the three-layer laminated molded unit of the backing member (41), the foamed layer (42) and the skin (43) is obtained. The surface layer (4) is cut into a desired size.

Figure 4:
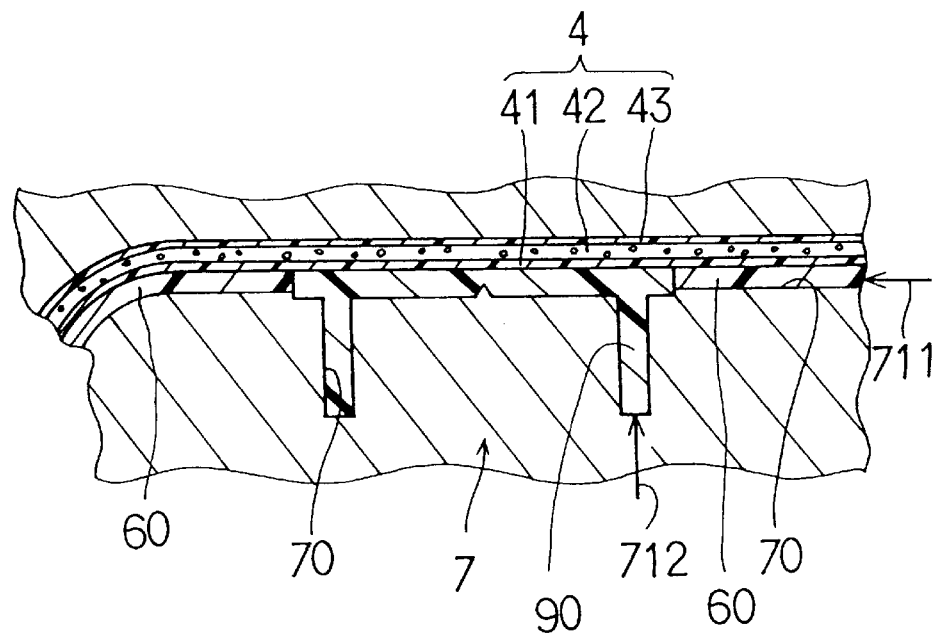
FIG. 4 is an explanatory illustration showing a method for molding the resin instrument panel according to Example 1.

As illustrated in FIG. 4, a molding (7) for molding a resin article comprising a cavity (70) in the shape of the instrument panel is prepared and the pre-molded surface layer (4) is inserted into the molding cavity (70).

Next, a first synthetic resin (60) for forming the main body is injected into the cavity (70) from a gate (711), filling most of the cavity, with the exception of a region reserved for molding the section piece. After filling, the first resin is allowed to harden. A second synthetic resin (90) for molding the section piece is injected from a gate (712) into a hollowed region of the mold reserved for forming the section piece in the cavity (70). The section piece can be formed either before or after molding the main body. The resulting product is the resin instrument panel article (1).

The instrument panel (1) of Example 1 comprises a main body (2), section piece (3) and a surface layer (4) having aforementioned elastic modulus in flexure and coefficient of linear thermal expansion values. The main body (2) has excellent rigidity and mechanical strength, and the section piece (3) can burst when the airbag (5) inflates. Further, since the instrument panel (1) is obtained by one-piece molding with little heat-deformation, the instrument panel has a satisfactory appearance, and may be used in numerous designs. Furthermore, the resin instrument panel article may be produced at relatively low cost.

The backing member (41) protects the skin (43) from the pressure generated during cure of the synthetic resins (60) and (90), injected for molding the main body and the section piece. Accordingly, these properties allow production the resin instrument panel article (1) without marring the natural appearance of the skin (43), or degrading the excellent texture of the foamed layer (42) and the skin (43).

Example 2

Figure 5:
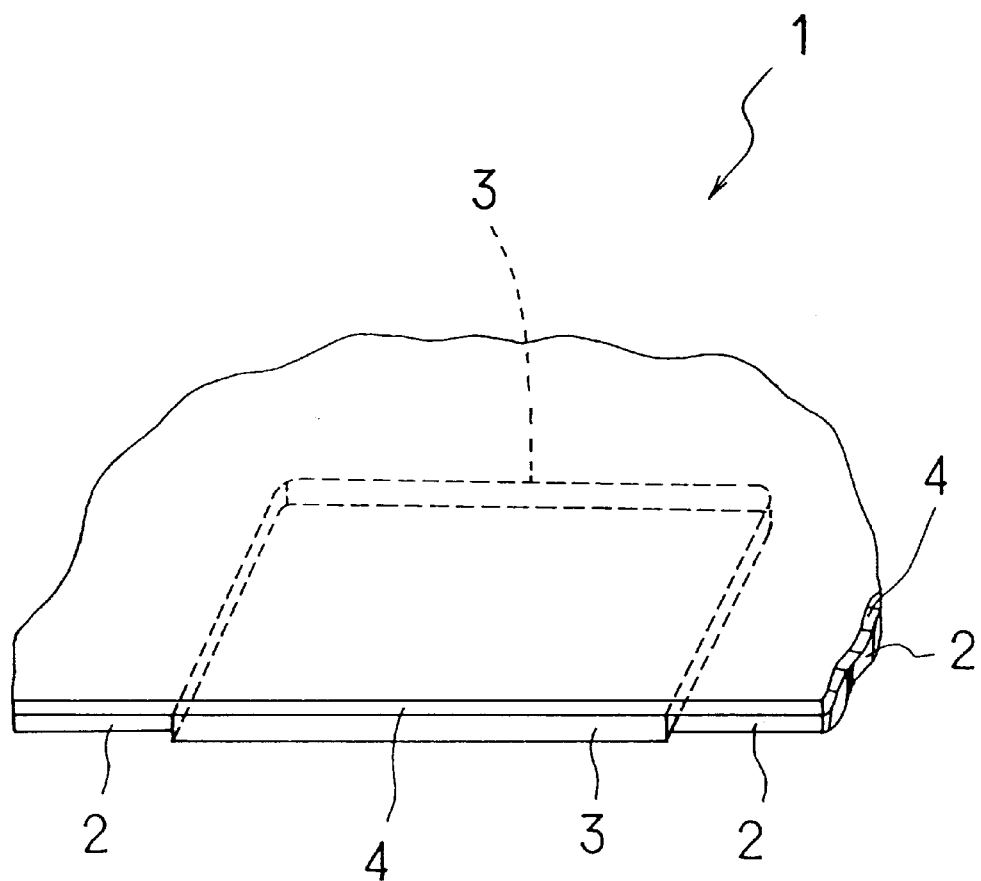
FIG. 5 is a perspective view of a resin instrument panel according to Example 2.

The instrument panel of Example 2 has a main body (2), which partially encloses or surrounds the section piece (3), as shown in FIG. 5.

A surface layer (4) covers the entire top surface of the section piece (3) and all of the surface of the main body (2), which is contiguous with surface layer (4). The surface layer (4) is again formed of a three-layer laminated structure similar to that of Example 1, as illustrated in FIG. 2. The production of the instrument panel of Example 2 is the same as the method described in Example 1, yielding a molded product having the characteristics described in Example 1.

Example 3

Figure 6:
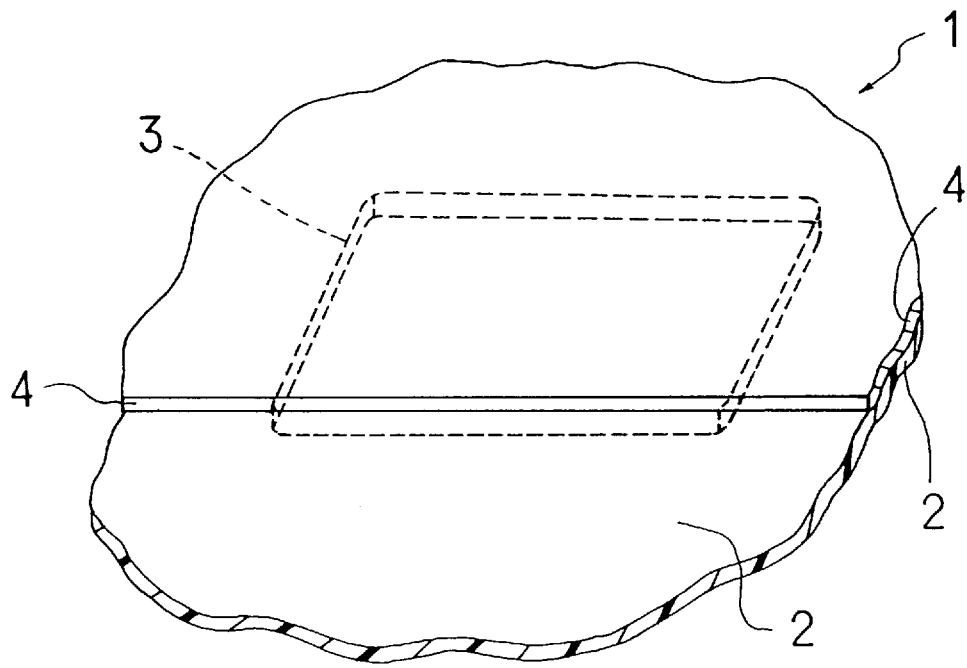
FIG. 6 is a perspective view of a resin instrument panel according to Example 3.

The instrument panel of Example 3 has a main body (2) encompassing the entire periphery of the section piece (3), as shown in FIG. 6. The surface layer (4) continuously coats the surfaces of the section piece (3) and part of the main body (2), covering the surfaces from the section piece (3) toward the three sides thereof. This surface layer (4) can again comprise a three-layer laminated structure similar to that of Example 1, as illustrated in FIG. 2. Production of the instrument panel of Example 3 is performed by the same method as described in Example 1, and the final instrument panel has the characteristics of the product of Example 1.

Example 4

Figure 7:
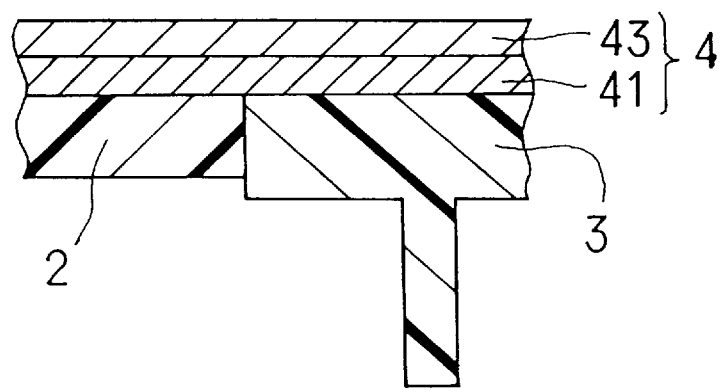
FIG. 7 is a sectional view of the resin instrument panel according to Example 4.

The instrument panel of Example 4 has a two-part surface layer (4) comprising a backing member (41) and a skin (43) as shown in FIG. 7.

The backing member (41) and the skin (43) are preferably formed of PP and can be formed as a laminated structure. Preferably, the resins forming the main body (2) and section piece (3) are injected at a relatively low pressure to avoid damaging the skin (43) during the injection molding process. The instrument panels of Example 4 are produced by the method described in Example 1, yielding final products with the properties of the products of Example 1.

Example 5

In Example 5, an instrument panel was obtained by varying the compositions of the main body, section piece and surface layer during one-piece molding, after which the product obtained was evaluated.

Initially, the instrument panel, as shown in Table 1, was molded by the same method as described in Example 1, but varying the compositions of the main body, the section piece and the surface layer. The surface layer of Example 5 comprised one layer of the backing member with a thickness of 1.0 mm. The thicknesses of the main body and the section piece were about 3.5 mm and 4.5 mm, respectively. Test samples of instrument panels obtained according to the present invention were assigned reference numbers 1–9, while the comparative samples were designated C1–C4.

As shown in Table 2, resins 1 and 2 were used as the synthetic resins for the surface layer, resins 3 to 8 were used as the synthetic resins for the section piece, and resins 8 and 9 were used as the synthetic resins for the main body. The elastic modulus in flexure and coefficient of linear thermal expansion values of each resin are shown in Tables 1 and 2.

The coefficient of linear thermal expansion values of the main body and section piece were measured in 3 mm×3 mm×20 mm samples at 110° C., using a thermal stress deformation measuring device, which is manufactured by Seiko instrument, Inc. This thermal stress measuring device is composed of a TMA/SS module measuring apparatus and TA Station. The TMA/SS Module holds a specimen between chucks secured by screwing on a specimen holder and a probe. The specimen holder may move upwards or downwards; such movement is controlled by a micrometer situated on top of the specimen holder. Variation in length of a sample is sensed by a differential transformer and its core, which respectively abut the specimen holder and the probe while a force is applied on the specimen. The TMA/SS Module measuring device is composed of a specimen part, a heating part and an electronic circuit part. Data is recorded by adjustment of TA Station. To obtain the coefficient of linear thermal expansion of the surface layer, 200 mm×30 mm samples were evaluated for their actual dimensions at normal temperature and at 110° C. The elastic modulus in flexure was measured according to JIS 7203.

Figure 8:
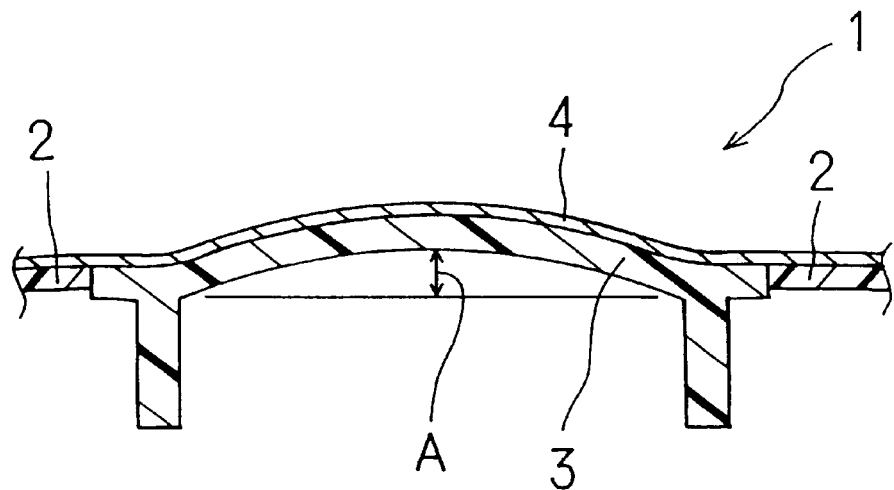
FIG. 8 is an explanatory illustration showing a method for measuring the deformation properties of the section piece during heating according to Example 5.
Figure 8:
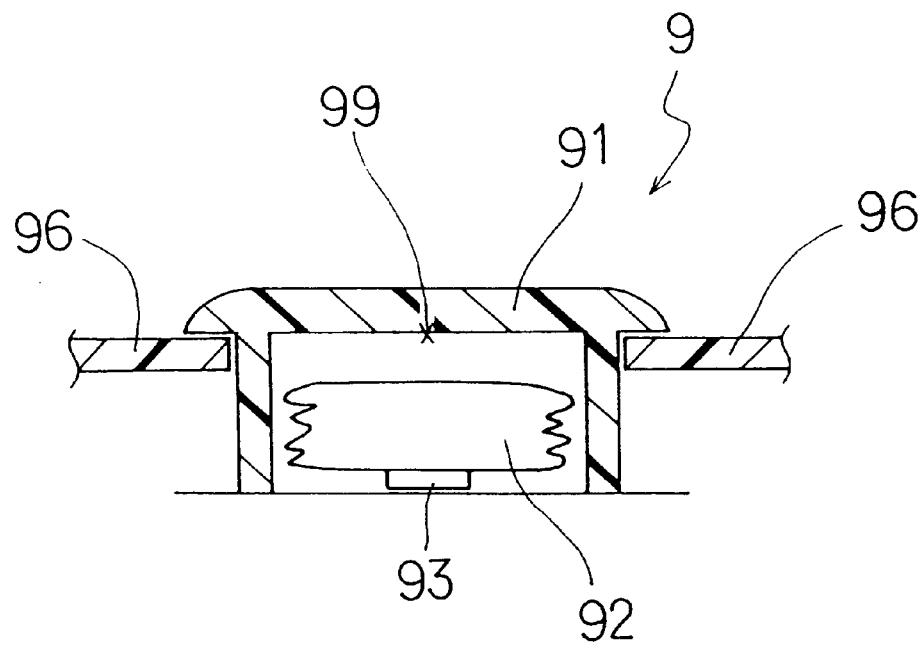

The resin instrument panels of Example 5 were evaluated for heat distortion and bursting properties on impact. As shown in FIG. 8, the heat distortion values were obtained by measuring a maximum heat distortion amount "A" of the section piece (3) by a scale after the resin article (1) was fixed at 110° C. The value "A" relates to a protuberant height from the surface of the article, shown in FIG. 8 as a displacement amount in a vertical direction. When the value of A is large, the appearance of the molded article is aesthetically degraded. This displacement is caused by a difference between the coefficient of linear thermal expansion of the section piece (3) and that of the surface layer (4) in FIG. 8. Tests at room temperature result in a such a small degree of displacement that precise measurements cannot be made. Accordingly, measurements are made at 110° C., the maximum temperature the resin instrument panel can withstand, in order to optimize the displacement.

The bursting property of section pieces employed as airbag covers in an instrument panel were evaluated by examining whether each section piece properly burst during impact-induced inflation of the airbag. In Table 2, proper bursting of each section piece is indicated by an O while improper bursting is designated by an X. Bursting was judged as being proper or improper depending upon whether each section piece tore precisely along a tear seam, whether fragments were dispersed and whether an airbag completely filled with gas before a test dummy impacted against the deployed airbag.

Table 2 shows that articles made according to the invention (samples 1–9) presented very little heat deformation and exhibited excellent bursting properties on impact, whereas the comparative samples (C1–C3) displayed greater heat deformation. The main body and the section piece of the resin instrument panel of the Comparative Example (C4) were formed of the same kind of synthetic resin, causing poor bursting properties on impact.

TABLE 1

| Resin | Resin composition | Linear expansion coefficients ° C. $^{-1}$) | Elastic modulus in flexure (MPa) |
|---|---|---|---|
| 1 | PP/talc | $9.6 \times 10^{-5}$ | 1250 |
| 2 | PP/EPR/talc | $4.9 \times 10^{-5}$ | 720 |
| 3 | PP/EBR/EPR | $1.5 \times 10^{-5}$ | 450 |
| 4 | PP/EBR/EPR/SEBR | $3.3 \times 10^{-5}$ | 330 |
| 5 | PP/EBR/EPR/SEBR | $4.2 \times 10^{-5}$ | 270 |
| 6 | PP/EBR/EPR | $7.6 \times 10^{-5}$ | 320 |
| 7 | PP/EBR/EPR/SEBR | $7.9 \times 10^{-5}$ | 200 |
| 8 | PP/EPR/talc/EBR | $6.0 \times 10^{-5}$ | 2500 |
| 9 | PP/EPR/talc/EBR | $6.0 \times 10^{-5}$ | 2100 |

PP: polypropylene
EPR: ethylene-propylene rubber
EBR: ethylene-butylene rubber
SEBR: styrene-ethylene-butylene rubber

TABLE 2

| Composition | Resin | Coefficient of linear thermal expansion (° C.$^{-1}$) | Elastic modulus in flexure (MPa) | C1 | C2 | C3 | 1 | 2 | 3 | 4 | 5 | 6 | 7 | 8 | 9 | C4 |
|---|---|---|---|---|---|---|---|---|---|---|---|---|---|---|---|---|
| Surface layer | 1 | $9.6 \times 10^{-5}$ | 1250 | ○ | ○ | ○ | ○ | ○ | ○ | | | | | | | |
| | 2 | $4.9 \times 10^{-5}$ | 720 | | | | | | | ○ | ○ | ○ | ○ | ○ | ○ | ○ |
| Section piece | 3 | $1.5 \times 10^{-5}$ | 450 | ○ | | | | | | | | | | | | |
| | 4 | $3.3 \times 10^{-5}$ | 330 | | ○ | | | | | | | | | | | |
| | 5 | $4.2 \times 10^{-5}$ | 270 | | | ○ | | | | | ○ | | | | | |
| | 6 | $7.6 \times 10^{-5}$ | 320 | | | | | ○ | | | | ○ | | ○ | ○ | |
| | 7 | $7.9 \times 10^{-5}$ | 200 | | | | | | ○ | | | | ○ | | | |
| | 8 | $6.0 \times 10^{-5}$ | 2500 | | | | | | | | | | | | | ○ |
| Main body | 8 | $6.0 \times 10^{-5}$ | 2500 | ○ | ○ | ○ | ○ | ○ | ○ | ○ | ○ | ○ | ○ | ○ | | ○ |
| | 9 | $6.0 \times 10^{-5}$ | 2600 | | | | | | | | | | | | ○ | |
| Functions | | Amount of deformation after heating (110° C.) (mm) | | 5.5 | 3.2 | 4.3 | 1.4 | 0.8 | 0.1 | 0.2 | 0.6 | 0.3 | 0.7 | 1.5 | 0.2 | 0.1 |
| | | Bursting property in impact | | ○ | ○ | ○ | ○ | ○ | ○ | ○ | ○ | ○ | ○ | ○ | ○ | X |

What is claimed is:

1. A molded article including:
   a main body comprising a first synthetic resin;
   a section piece comprising a second synthetic resin, integrally molded with said main body, and
   a surface layer comprising a third synthetic resin molded to and overlying an upper surface of said section piece, and at least a portion of an upper surface of said main body,
   wherein said main body comprises a first synthetic resin having an elastic modulus in flexure in a range of about 2,000 MPa to about 4,000 MPa and a coefficient of linear thermal expansion of about $3-12 \times 10^{-5}$ ° C.$^{-1}$;
   wherein said section piece comprises a second synthetic resin different from said first synthetic resin, having an elastic modulus in flexure in a range of about 100 MPa to 700 MPa and a coefficient of linear thermal expansion of about $1-10 \times 10^{-5}$ ° C.$^{-1}$; and
   wherein said surface layer comprises a third synthetic resin having an elastic modulus in flexure in a range of about 300 MPa to about 2,000 MPa and a coefficient of linear thermal expansion of about $3-12 \times 10^{-5}$ ° C.$^{-1}$.

2. The molded article according to claim 1, wherein said first synthetic resin comprises one or more synthetic resins selected from group consisting of thermoplastic olefin resins, thermoplastic styrene resins, thermoplastic polyurethane resins and thermosetting polyurethane resins.

3. The molded article according to claim 1, wherein said second synthetic resin comprises one or more synthetic resins selected from group consisting of thermoplastic olefin resins, thermoplastic styrene resins, thermoplastic polyurethane resins, thermosetting polyurethane resins and thermoplastic polyester resins.

4. The molded article according to claim 1, wherein said third synthetic resin comprises one or more synthetic resins selected from group consisting of thermoplastic olefin resins, thermoplastic styrene resins, poly(vinyl chloride) resins, thermoplastic polyurethane resins, thermosetting polyurethane resins and thermoplastic polyamide resins.

5. The molded article according to claim 1, wherein said surface layer comprises a layer-structure having a backing member and a skin.

6. The molded article according to claim 5, wherein said surface layer comprises an elastic foamed layer disposed between the backing member and the skin.

7. The molded article according to claim 1, wherein the resin article is an instrument panel.

8. The molded article according to claim 7, wherein said section piece encloses an airbag.

9. The molded article according to claim 1, wherein said surface layer entirely covers said main body and said section piece.

10. The molded article according to claim 1, wherein said section piece includes a periphery that is partially surrounded by said main body.

11. The molded article according to claim 1, wherein said main body and said section piece are molded with an upper surface of each forming a level surface.

* * * * *